United States Patent [19]
McGahee

[11] 3,910,226
[45] Oct. 7, 1975

[54] QUICK LINE COUPLING DEVICE FOR PENNANTS

[75] Inventor: Welbourne D. McGahee, Melbourne, Fla.

[73] Assignee: Loop-A-Line, Inc., Melbourne, Fla.

[22] Filed: May 7, 1974

[21] Appl. No.: 467,681

[52] U.S. Cl............................... 116/173; 24/131 R
[51] Int. Cl.².......................................... G09F 17/00
[58] Field of Search........ 116/173; 24/131 R, 129 C

[56] References Cited
UNITED STATES PATENTS

| | | | |
|---|---|---|---|
| 411,033 | 9/1889 | Huffman | 24/131 R |
| 2,342,017 | 2/1944 | Shepherd | 116/173 |
| 2,876,517 | 3/1959 | Stanley | 24/131 R |

Primary Examiner—Richard C. Queisser
Assistant Examiner—Marcus S. Rasco
Attorney, Agent, or Firm—Warren E. Ray

[57] ABSTRACT

A quick line coupling device made of springy wire for use in coupling a halyard to a flag or pennant, the coupling device cooperating with flag eyelets or sewn in the inboard hem of the flag, including a horizontal circular portion closing upon itself, the horizontal circular portion being integrally connected to a left and right upstanding bends having a lower horizontal portion therebetween, the right upstanding bend continuing upward via a middle upstanding member and passing through the horizontal circular portion, thence upward to an upper curvilinear member culminating in an eye or a bead.

7 Claims, 4 Drawing Figures

U.S. Patent  Oct. 7,1975  3,910,226

QUICK LINE COUPLING DEVICE FOR PENNANTS

BRIEF SUMMARY OF THE INVENTION

Taken in conjunction with the Abstract a simple connector device is provided for securing and detaching a flag to a halyard without the need for access to the ends of the halyard and without the use of snaps with springs that deteriorate with use. The halyard is knotted at spaced intervals to correspond with the flag widths that may be used to prevent the up and down movement of the flag. For a similar purpose the halyard may be engaged with the connectors by use of a 360° loop in the halyard, but more slack line would be required.

The primary object of the invention is the provision of a coupling device made of springy wire cooperating with a flag and a halyard whereby the use of snaps is eliminated.

Another object is the provision of a coupling device which may be attached to the eyelets of a flag and left in place whereby a halyard may be quickly attached or detached.

Other objects and advantages will clearly appear from a description of preferred embodiments as shown in the accompanying drawings, in which.

DETAILED DESCRIPTION

Figure 1:
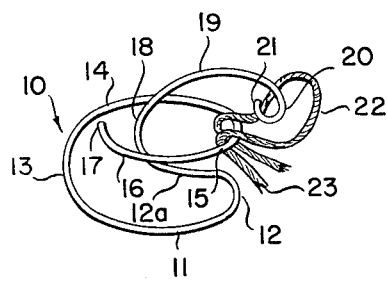
FIG. 1 is a somewhat pictorial view on about a 45° angle from a top view of one embodiment of the connector and showing a step in attaching a line.
Figure 2:
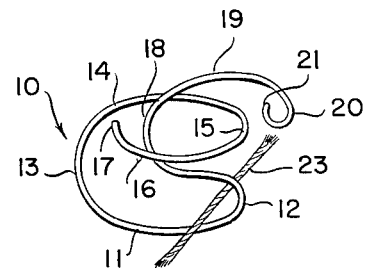
FIG. 2 is similar to FIG. 1 showing the line or halyard in operative position.
Figure 3:
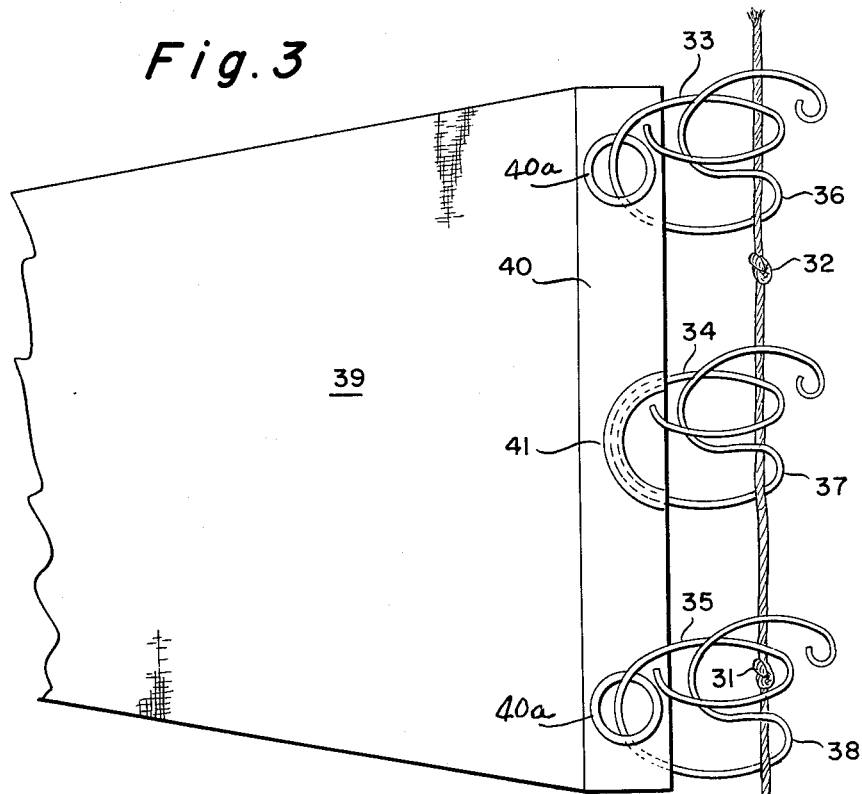
FIG. 3 illustrates a plurality of connectors cooperating with a flag and halyard.
Figure 4:
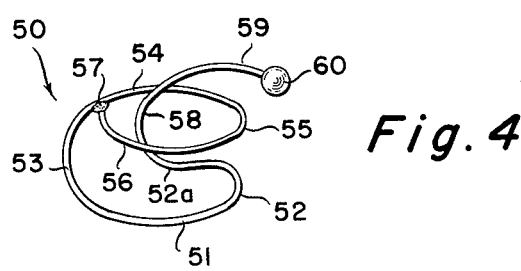
FIG. 4 depicts a modified connector wherein the eye is replaced with a bead, and the end of the circular portion is joined to the circular portion with a weld.

The connector is the same in FIGS. 1–3, with a slight modification shown in FIG. 4. It will be appreciated that the connector is illustrated somewhat oversized and the knots in the halyard in FIG. 3 are undersized for ease in illustration. However, it will be understood that the knots are of such size as to prevent the halyard from passing through the connector. The knots may be dispensed with and a 360° line loop used instead as will be described hereinafter.

Turning now to the drawing, FIG. 1 and FIG. 2 show one embodiment of the connector and also indicate how the line or halyard is attached. The connector, generally indicated by the numeral 10, includes a horizontal circular portion comprising a back circular portion 14, a right circular portion 15, and a front circular portion 16 having and end 17 leaving a slight gap adjacent the back circular portion 14. The back circular portion 14 is integral with a left upstanding bend 13 which is connected to a right upstanding bend 12 via a lower horizontal connecting member 11. The right upstanding bend continues up and to the left through a middle horizontal member 12 a, a middle upstanding bend 18, thence to an upper curvilinear member 19 culminating in an eye 20 having an end 21. In attaching the line 23 to the connector, a bight or loop 22 (FIG. 1) is passed from below upward through the horizontal circular member, over the eye 20, and back down over the upper curvilinear member 19. A pull on the line 23 will place it in the position shown in FIG. 2. Similar numerals are used in FIG. 1 and FIG. 2.

In FIG. 3 the pennant or flag 39 having the usual fold 40 and eyelets 40a is shown with the halyard or line 30 as utilized with the connectors. The line 30 is provided with a lower knot 31 and an upper knot 32 which prevent the flag from vertical movement along the line 30, it being understood that the connectors are shown oversized for purposes of illustration. The upper line coupling device 33 with right upstanding bend 36 and lower line coupling device 35 with right upstanding bend 38 are shown threaded through the usual eyelets on flag 39. The middle line coupling device 34 with right upstanding bend 37 is shown as attached to the flag fold 40 by a hem 41. The knots 31, 32, or other knots are spaced along the halyard to coincide with the spacing of one or several flags. If knots are not desired, the bight of a line held in the hand may be turned over in either direction, and the topmost line portion pulled through the bight into a kind of slip knot. The bight may then be attached to the connector as described with respect to FIGS. 1 and 2, and a pull on the line will result in the line passing through the connector with a 360° bend or turn. Attachment of the line in this manner will secure the flag against up and down movement. However, slightly more line slack will be required, but again the line ends need not be accessable. This method of attachment is not illustrated as it is believed that it is not necessary for comprehension of the invention.

The connector shown in FIG. 4 is similar to those illustrated in other figures with slight modifications as will now be described. The numeral 50 generally indicates the modified connector which includes a lower horizontal member 51 connected to a right upstanding bend 52 and a left upstanding bend 53. The right upstanding bend 52 continues upward through a middle upstanding bend 58 via a middle horizontal member 52a, and thence to an upper curvilinear member 59 culminating in an end bead 60. The left upstanding bend 53 is connected to a horizontal circular member encircling the middle upstanding bend 58 which includes a back circular portion 54, a right circular portion 55, and a front circular portion 56, the latter having an end connected to the back circular portion 54 by means of brazing material 57. The only differences in this embodiment is the substitution of the bead 60 for the eye 20 and the addition of brazing material 57 to fill the gap between the end 17 and the back circular portion 14 (as shown in FIG. 1).

One way to insert the connector into a flag eyelet is to turn the connector upside down from that shown in FIGS. 1–2, pass a corner of the flag with eyelet through the horizontal circular portion, slide the edge of the eyelet through the gap, slide the eyelet around the horizontal circular portion, pass the eyelet edge again through the gap, and straighten up the connector so it will appear as shown in FIG. 3 as at upper line coupling device 33. The embodiment in FIG. 4, having no gap, must be inserted in another way. This may be accomplished by inserting the eyelet and flag corner up through the horizontal circular portion in back of the upper curvilinear member 59, passing the eyelet over the bead 60 and over the bends 58, 52, and thence to the position shown in FIG. 3 at upper connector 33. In the case of the lower line coupling device 35, the lower corner of the flag 39 is raised, but the eyelet and flag corner is passed up through the horizontal circular member in front of the upper curvilinear member 59 and performing the remaining steps as set forth above for connector 33. Failure to observe this procedure will result in having the connector reversed from that shown in FIG. 3. In a similar fashion the middle line coupling device 34 may be connected to the flag when it is not sewn into the flag. It will be understood that the connector of FIGS. 1–3 may be affixed to the flag eyelets in the same manner, but the process is easier when the connector has a gap.

While for purposes of description I have shown and described specific embodiments of my invention, it will be apparent that changes and modifications can be made therein without departing from the spirit of my invention or the scope of the appended claims.

I claim:

1. A pennant or the like having eyelets or the like, a line, and a quick coupling device in combination, said quick coupling device comprising a horizontal circular member including a back circular portion, a right circular portion, and a front circular portion, said front circular portion having an end adjacent to said back circular portion, a left upstanding bend connected to said back circular portion, a lowered horizontal member connected to said left upstanding bend, a right upstanding bend connected to said lower horizontal member, a middle horizontal member connected to said right upstanding bend, said middle horizontal member continuing upward through a middle upstanding bend passing centrally through sais horizontal circular member and connected to an upper curvilinear member having an end means, said coupling device left upstanding bend passing through said eyelets or the like on said pennant or the like, and said right upstanding bend retaining said line.

2. The combination of claim 1 wherein said means connected to said upper curvilinear member comprises an eye member.

3. The combination of claim 1 wherein said means connected to said upper curvilinear member comprises a bead.

4. The combination of claim 1 wherein said front circular portion having an end adjacent to said back circular portion has a gap therebetween.

5. The combination of claim 1 wherein said front cicular portion having an end adjacent to said back circular portion has a gap therebetween filled with a brazing material joining said portions.

6. The combination of claim 1 wherein said pennant or the like includes a fold and wherein said left upstanding bend of said coupling device is sewn into said fold.

7. The combination of claim 1 wherein said line passing through said coupling device adjacent said right upstanding bend has knots therein preventing up and down movement of the said pennant or the like with respect to said line.

* * * * *